Nov. 26, 1968  G. T. DAVIES  3,412,979
AEROFOIL-SHAPED BLADE FOR USE IN A FLUID FLOW
MACHINE SUCH AS A TURBINE
Filed Nov. 25, 1966
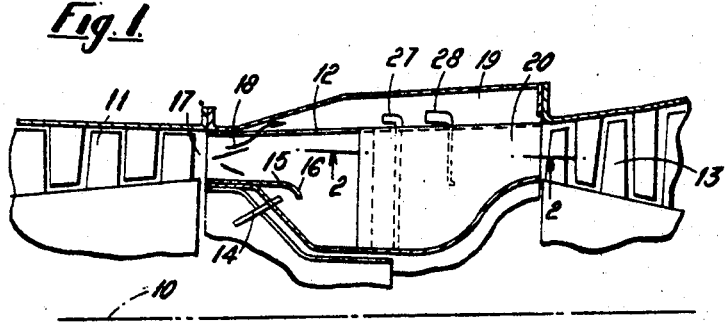
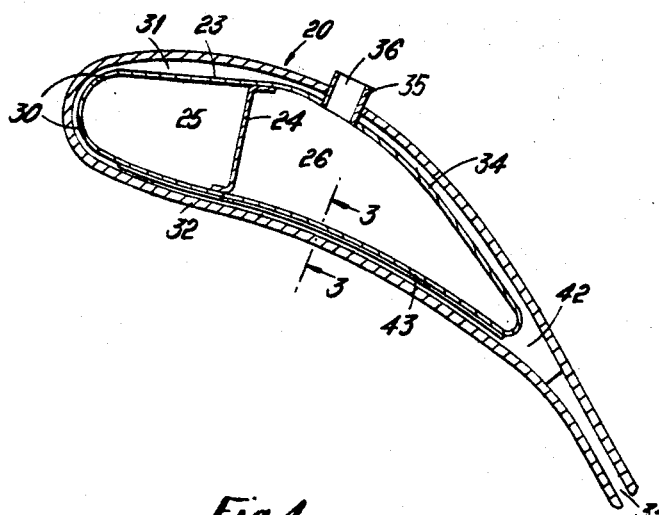
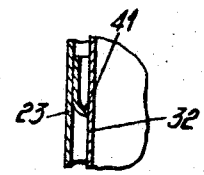
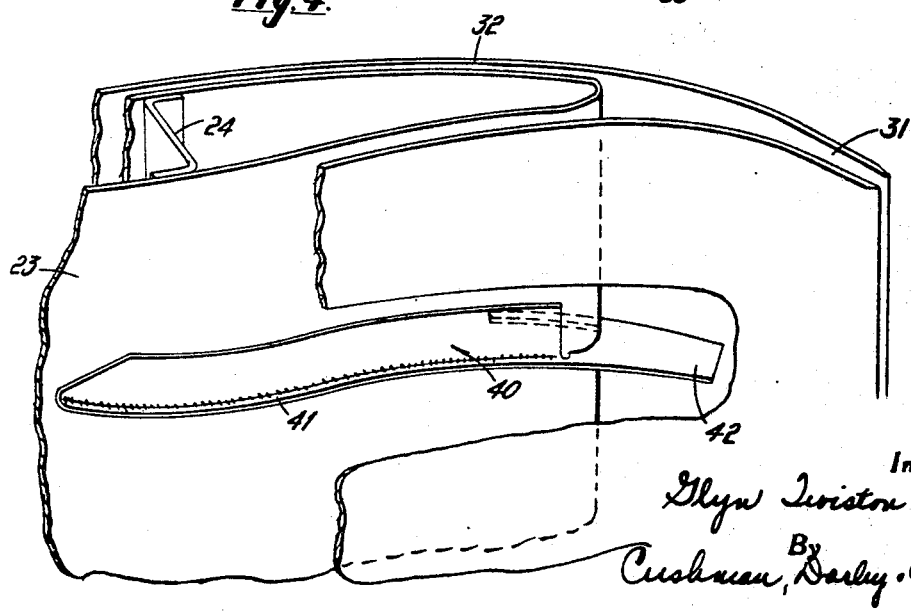
Inventor
Glyn Twiston Davies
By
Cushman, Darby · Cushman
Attorneys

United States Patent Office 3,412,979
Patented Nov. 26, 1968

3,412,979
AEROFOIL-SHAPED BLADE FOR USE IN A FLUID FLOW MACHINE SUCH AS A TURBINE
Glyn Twiston Davies, Milford, Derby, England, assignor to Rolls-Royce Limited, Derby, England, a British company
Filed Nov. 25, 1966, Ser. No. 597,078
Claims priority, application Great Britain, Dec. 10, 1965, 52,633/65
6 Claims. (Cl. 253—39.1)

ABSTRACT OF THE DISCLOSURE

An aerofoil-shaped blade for a gas turbine engine has an external wall and an internal wall and a space therebetween. Apertures are provided in the internal wall for directing some of the cooling fluid admitted to the interior of the interior wall to flow over the interior of the external wall so as to cool it. The cooling fluid escapes from the space between the two walls by means of an aperture in the trailing edge of the blade. A plate extending across the space between the interior and exterior walls is provided so as to limit the flow of cooling fluid in the space towards the low pressure region thereof and to increase the flow of cooling fluid passing over the radially outer portion of the blade. Three ducts are provided through which a portion of cooling fluid entering the interior of the interior wall passes directly to the exterior of the blade without mixing with the cooling air from the space between the two walls.

---

This invention, which concerns an aerofoil-shaped blade of the type adapted for use in a fluid flow machine such as a gas turbine engine or a steam turbine, is an improvement in or modification of the invention disclosed in the copending U.S. patent application No. 508, 683 which is now United States Patent 3,353,351, issued Nov. 21, 1967. The present application has a common assignee, Rolls-Royce Limited, Derbyshire, England, as the aforementioned United States patent.

According to the present invention, there is provided an aerofoil-shaped blade of the type referred to, said blade having an external wall, fluid receiving means surrounded by and spaced from said external wall for receiving cooling fluid, said fluid receiving means being formed to direct some of the cooling fluid over the interior of the external wall to cool the latter, the external wall having at least one aperture enabling the cooling fluid to escape from the space between the fluid receiving means and the external wall, baffle means in said space for guiding the flow of cooling fluid therein, and means defining at least one passage through which a portion of the fluid entering the fluid receiving means passes across the said space directly to the exterior of the said blade without mixing with the fluid in the space.

The baffle means preferably limits flow of cooling fluid in said space towards a low pressure region thereof.

The baffle means preferably increases the flow of cooling fluid passing over a radially outer portion of the blade.

The baffle means may comprise a plate which extends between a portion of the interior of the said external wall and an adjacent portion of the fluid receiving means.

The plate may extend axially to a greater extent over one side of the fluid receiving means than over the other side thereof, the said passage or passages being provided at the said other side.

The radial extent of the blade at its upstream end may be substantially greater than its radial extent at its downstream end.

The fluid receiving means is preferably a sleeve. A partition may, moreover, be provided which divides the sleeve into a first compartment which has apertures for directing cooling fluid into said space, and a second compartment from which the cooling fluid may pass outwardly through the passage or passages. There may be scoops for directing cooling fluid into said compartments.

The invention also comprises an annular combustion chamber for a gas turbine engine having a plurality of angularly spaced apart nozzle guide vanes therein which are constituted by blades as set forth above. Thus, the radial extent of the combustion chamber may be substantially greater centrally of its ends than at either of said ends.

The invention is illustrated, merely by way of example, is the accompanying drawings, in which:

FIGURE 1 is a broken-away sectional view of part of a gas turbine engine having nozzle guide vanes in accordance with the present invention, FIGURE 2 is an enlarged sectional view of such a nozzle guide vane taken on the line 2—2 of FIGURE 1, FIGURE 3 is a broken-away sectional view taken on the line 3—3 of FIGURE 2, and FIGURE 4 is a broken-away diagrammatic perspective view of such a nozzle guide vane.

In FIGURE 1 there is shown no one side of the centre-line 10 of a gas turbine engine, an axial flow compressor 11, an annular combustion chamber 12, and a turbine 13 which drives the compressor 11.

The combustion chamber 12 is supplied with fuel by way of a plurality of angularly spaced apart pipes 14 (only one shown), the fuel being sprayed from each of the pipes 14 onto a splash plate 15 having a curled downstream end 16.

Part of the air compressed by the compressor 11 is employed for combustion within the combustion chamber 12 and passes axially through an inlet 17 thereof. Part of the air compressed by the compressor 11, however, is employed as dilution air which dilutes the products of combustion so that their temperature is acceptable to the turbine 13, this dilution air following the path indicated by the arrow 18 so as to enter an annular dilution air passage 19.

A plurality of angularly spaced apart nozzle guide vanes 20 are mounted in the downstream half of the combustion chamber 12.

Mounted within each of the nozzle guide vanes 20 is a sleeve 23 which is divided by a partition 24 into compartments, 25, 26. Dilution air from the dilution air passage 19 is directed into the compartments 25, 26, by way of scoops 27, 28 respectively.

The dilution air supplied to the compartment 25 passes outwardly thereof and through apertures 30 into a space 31 between the sleeve 23 and the external wall 32 of the nozzle guide vane 20, the external wall 32 completely surrounding the sleeve 23. The dilution air which has thus entered the space 31 passes over the interior of the external wall 32 so as to cool the latter, and finally escapes from the space 31 through a radially extending aperture 33 at the trailing edge of the external wall 32.

The sleeve 23, on the side 34 thereof, is provided with a plurality of radially spaced apart stub pipes 35 (only one shown) which extend outwardly through the external wall 32. The stub pipes 35 provide passages 36 through which dilution air from the compartment 26 may pass across the space 31 and thus outwardly to the exterior of the nozzle guide vane without mixing with the air in the space 31.

The radial extent of the combustion chamber 12 is substantially greater centrally of its ends than at either of its opposite ends. In order to conform to this shape of the combustion chamber 12, each of the nozzle guide vanes 20 has a radial extent at its upstream end which is substantially greater than its radial extent at its downstream end. Thus, the radially innermost portion of the space 31 will, in operation, form a low pressure region and it is desirable to prevent all of the air supplied to the space 31 from passing directly to this low pressure region, since if this is permitted there will be inadequate cooling of the radially outer portion of the nozzle guide vane 20.

For this reason, a substantially L-shaped plate 40 is provided which is welded to a portion of the sleeve 23 and which has a curved portion 41 which engages an adjacent portion of the interior of the external wall 32. The plate 40, which has a part 42 which extends downstream of the trailing edge of the sleeve 23, extends axially over the side 34 of the sleeve 23 to a smaller extent than over the opposite side 43 thereof.

The plate 40 thus acts as a baffle which limits the flow of cooling fluid towards the said low pressure region and which increases the flow of cooling fluid passing over the said radially outer portion of the nozzle guide vanes.

I claim:

1. In an airfoil-shaped blade for a fluid flow machine of the type having an external wall, fluid receiving means for receiving cooling fluid and having at least two sides and surrounded by said external wall, said fluid receiving means and said external wall defining a space therebetween having a low pressure region toward a radially inner portion of the blade and a high pressure region toward the radially outer portion of the blade, said fluid receiving means further having apertures for directing some of the cooling fluid over the interior of the external wall to cool the latter, said external wall having at least one aperture for discharging the cooling fluid from said space, and means defining at least one passage through which a portion of the fluid entering the fluid receiving means passes directly to the exterior of said blade without mixing with the fluid in said space between the fluid receiving means and the external wall, the improvement comprising: a baffle plate in said space, said baffle plate extending between a portion of the interior of said external wall and an adjacent portion of said fluid receiving means for guiding the flow of cooling fluid in said space so as to limit the flow of cooling fluid toward the low pressure region thereof and increase the flow of cooling fluid passing over the interior of the radially outer portion of the external wall of the blade.

2. A blade as claimed in claim 1 in which the plate extends axially to a greater extent over one side of the fluid receiving means than over the other side thereof, said passages for discharging cooling fluid from said fluid receiving means to said space being provided at the said other side.

3. A blade as claimed in claim 1 in which the radial extent of the blade at its upstream end is substantially greater than its radial extent at its downstream end.

4. A blade as claimed in claim 1 in which the fluid receiving means is a sleeve.

5. A blade as claimed in claim 4 in which said sleeve has an interior partition defining first and second compartments, and in which said apertures of said fluid receiving means are located in said first compartment, and in which said means defining at least one passage communicates with said second compartment.

6. A blade as claimed in claim 5 in which scoops are provided for directing cooling fluid into said compartments.

References Cited

UNITED STATES PATENTS

| | | |
|---|---|---|
| 2,879,028 | 3/1959 | Stalker. |
| 3,301,527 | 1/1967 | Kercher. |
| 3,353,351 | 11/1967 | Bill et al. _____ 60—39.66 XR |

JULIUS E. WEST, *Primary Examiner.*